UNITED STATES PATENT OFFICE.

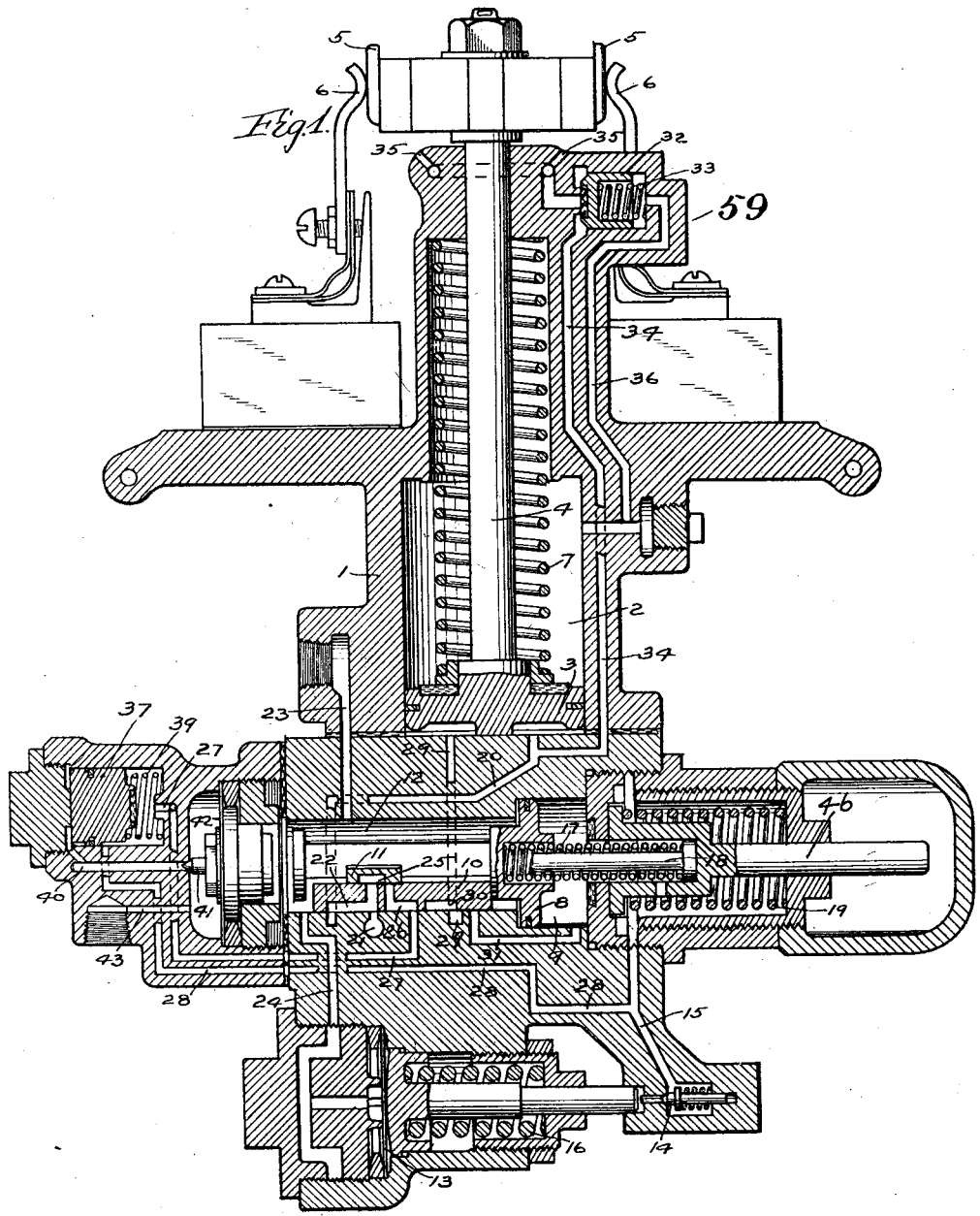

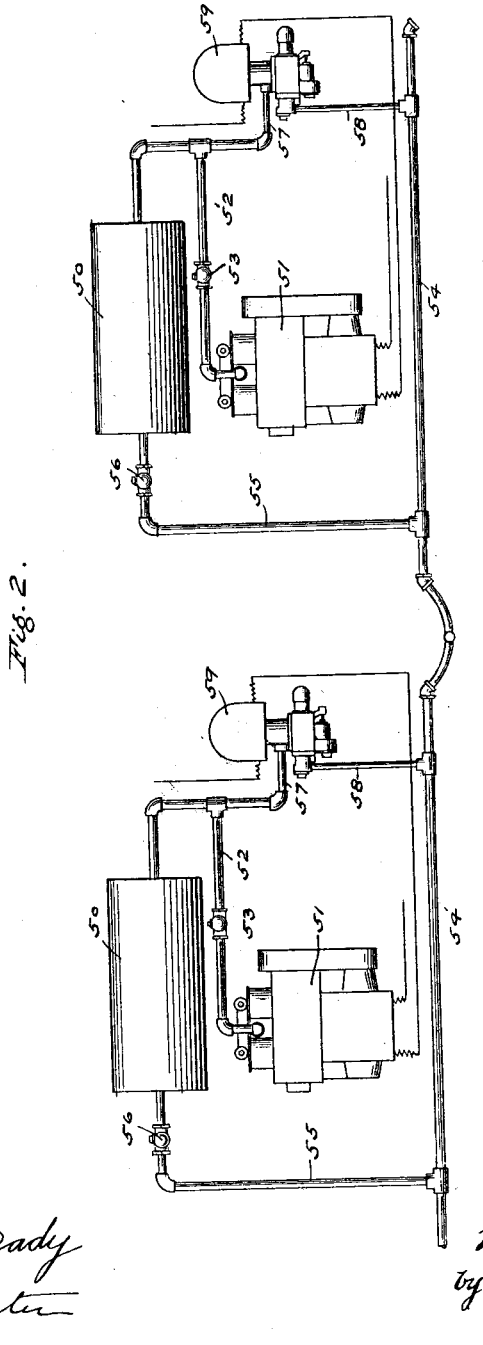

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

PRESSURE-GOVERNOR FOR PUMPS.

1,071,829.  Specification of Letters Patent.  Patented Sept. 2, 1913.

Application filed November 20, 1908. Serial No. 463,605.

*To all whom it may concern:*

Be it known that I, WALTER V. TURNER, a citizen of the United States, residing at Edgewood, in the county of Allegheny and State of Pennsylvania, have invented new and useful Improvements in Pressure-Governors for Pumps, of which the following is a specification.

This invention relates to pressure governors for pumps, and more particularly to that type of governor in which a valve mechanism governed by pump pressure is employed for controlling the pressure on the actuating piston of a pump controlling device.

It has heretofore been proposed to provide a high tension regulating device subject to pump pressure and adjusted to a predetermined high degree of pump pressure and a low tension regulating device subject to pump pressure and adjusted to a predetermined low degree of pump pressure for causing the movement of a main valve mechanism so as to respectively cut the pump out of and into action, with the desired range between the cutting out and cutting in pressures.

One object of my invention is to simplify the construction of the governor by eliminating one regulating device, and then providing means whereby the movement of the main valve mechanism in one direction is directly controlled according to the degree of pump pressure acting thereon.

Still another feature of my invention consists in providing improved means for causing the operation of the pump governor according to the pressures from different pumps.

In the accompanying drawing, Figure 1 illustrates a vertical central section of a pressure governor embodying a preferred form of my improvement and Fig. 2 a diagrammatic view of two electrically driven pump equipments coupled up with my invention applied thereto.

According to the drawings, the pressure governor shown is of that type adapted to control an electric switch in the pump motor circuit and comprises a casing 1 having a piston chamber 2 containing an actuating piston 3 for controlling an electric switch, the movable contacts 5 of which are attached to piston stem 4 and whose fixed contacts 6 are arranged in the pump motor circuit in the usual manner. On one side, the piston 3 is subject to the pressure of a spring 7 and the piston is operated by varying the fluid pressure on the opposite side.

For this purpose a main valve 10, contained in valve chamber 12 is provided, having a cavity 22 adapted in one position of the valve to connect port 20, opening to the chamber at the inner face of piston 3, with exhaust port 21, and adapted in another position to uncover the port 20 to valve chamber 12. The valve 10 is operated by a movable abutment 8 contained in piston chamber 9. The valve chamber 12 being open to the storage reservoir of the pump through passage 23, one side of abutment 8 is constantly subject to pump pressure and means are provided for permitting equalization of pressures on opposite sides of the abutment, either around the abutment or through equalizing ports in the abutment. The outer face of abutment 8 is also subject to the pressure of a light spring 17 and in traveling outwardly is adapted to engage a stem 18 bearing against a spring thimble 46 subject to the pressure of a heavier adjustable spring 19, so that in the extreme outer position the abutment 8 is subject to the pressures of both springs 17 and 19.

For causing the movement of the main valve mechanism in the outward direction a regulating valve means is provided comprising a movable diaphragm 13, subject on one side to pump pressure through passage 24 leading to valve chamber 12 and on the opposite side to the pressure of an adjustable spring 16, and a vent valve 14 adapted to be operated by said diaphragm for releasing fluid from the piston chamber 9 at the outer face of abutment 8, through a passage 15. There being no pressure in the storage reservoir, the abutment 8 is held to its inner position by spring 17 and vent valve 14 is closed. The inner face of piston 3 is consequently open to the exhaust port 21 through port 20 and cavity 22 so that the piston assumes its cut in position connecting the switch contacts 5 and 6. The circuit of the pump motor being closed, the pump compresses air into its storage reservoir and into valve chamber 12. The abutment 8 remains in its inner position, however, as the fluid equalizes around abutment 8 to the piston chamber 9, said abutment being a loose fit in the piston chamber 9 so as to permit air to slowly leak around the same. When the pump pressure rises on diaphragm 13 to a degree exceeding the pressure of the spring 16 the vent valve 14 is opened by the movement of the diaphragm 13 and fluid is released from piston chamber 9, so that the higher pressure on the opposite side of abutment 8 moves the same outwardly.

In order to insure full and prompt movement of the main valve mechanism an auxiliary valve 11, mounted on and having a movement relative to the main valve, may be provided and on the first outward movement of abutment 8 said valve is carried forward so that a cavity 25 therein connects port 22 with a port 26 in the slide valve 10. A direct communication is thus established from piston chamber 9 to exhaust port 21, through passages 15, 28, and 27, port 26, cavity 25 and port 22, and thereby abutment 8 is caused to quickly move to its extreme outer position, at first against the resistance of spring 17 and finally, just before the abutment seats, against the added resistance of spring 19. In the outer seated position of abutment 8, a portion of the area thereof is cut off from the pressure piston chamber 9, and as the ports 22 and 26 are provided with foot extensions, the port 27 remains in communication with exhaust port 21, so that the seated portion of the abutment 8 is maintained open to the atmosphere. The remaining area of the outer face of the abutment is kept at pump pressure by leakage around same, but to insure the full maintenance of such pressure against possible leakage, a port 31 may be provided leading from piston chamber 9 to the seat of the slide valve 10 and connected in the outer position of the parts by cavity 30 with port 29 leading to piston 3. The movement of main valve 10 outwardly uncovers port 20, so that fluid is admitted to piston 3, causing the same to be suddenly shifted outwardly, opening the switch and stopping the pump.

It will be noted that when the abutment 8 is seated in its outer position it is subject on its inner face to pump pressure and on its outer face to the pressures of springs 17 and 19 and pump pressure on a portion of its area. The spring 19 is adjusted so that when the pump pressure acting on the inner face of the abutment 8 diminishes to a predetermined desired degree, the total fluid and spring pressure acting on the outer face will move the abutment from its seat. The preliminary movement of abutment 8 from its outer seat, shifts auxiliary valve 11 so as to cut off communication from the exhaust port 21 to piston chamber 9, and consequently the full area of abutment 8 is immediately subjected to pump pressure supplied through port 31. The fluid pressures being thus equalized on abutment 8, the springs 17 and 19 rapidly shift the main valve mechanism to its extreme inner position, in which port 20 is connected to exhaust port 21, through cavity 22, releasing fluid from piston 3 and thus causing spring 7 to shift the piston and connect the switch contacts 5 and 6. A blow out device such as described in application Serial No. 539,664, the subject matter of which was divided out of the present application, may be employed in connection with the present construction, comprising piston valve 32, subject on one side to the pressure of a spring 33 tending to seat the valve 32 and cut off communication from a supply port 34 leading to the chamber at the inner face of piston 3 to blow out ports 35 which serve to direct the flow of air to the switch contacts.

On one side the piston valve 32 is subject to the fluid pressure in the supply passage 34 and the opposite side is connected by a passage 36 to the piston chamber 2. The opening of passage 36 into chamber 2 being so positioned that when the piston 3 is in its inner position the port opens to the space above the piston while when the piston is in its outer position said port opening is below the piston.

It will now be seen that when fluid under pressure is admitted to the piston 3 air flows through passage 34 and acting on one face of piston valve 32, the opposite side being now at atmospheric pressure, overcomes the resistance of spring 33 and the valve opens, so that a jet of air is supplied to the switch contacts. As soon as the piston 3 assumes its outer position the passage 36 opens to the space below the piston, and fluid under pressure is admitted to the spring side of piston valve 32, thus equalizing the fluid pressures on the opposite sides, so that spring 33 is permitted to close the valve and cut off the flow of air to the switch contacts. It will be noted that with this construction upon the inward movement of the parts to close the switch, the opposite sides of piston valve 32 are at atmospheric pressure, so that the spring 33 holds the valve 32 closed and thus waste of air in the down stroke of the piston is prevented.

Where two or more pumps are employed to compress air into a common receptacle, such as a pipe line connecting all the pump reservoirs, it has been heretofore proposed to provide means adapted to operate to cut in a particular pump either upon a certain decrease in its storage reservoir pressure or upon a certain increase in reservoir line pressure, and it is a further object of my invention to provide an improved means for accomplishing the above purpose.

In Fig. 2 of the drawings, two electrically controlled pumps are shown coupled together, the equipment on each car comprising a storage reservoir 50 connected to the pump 51 by pipe 52 containing check valve 53 and to the pipe line 54 by a pipe 55 containing check valve 56, all of which may be of the usual construction as heretofore employed. Passage 23 of the pump governor 59 is connected to the pump supply pipe 52 by a pipe 57 and passage 43 thereof is connected by pipe 58 to the pipe line 54.

In order to carry out the feature of my invention relating to the control of two or more pumps when coupled up in a train I preferably provide a piston valve 37, as shown in Fig. 1, arranged to control communication from port 27 to a passage 28, opening into the piston chamber 9 at the outer face of abutment 8. One side of the piston valve 37 is subject to a spring 39 tending to unseat the valve and the opposite side is open to the pressure from a passage 40 controlled by a valve 41. A movable diaphragm 42 operates the valve 41 and is subject on one side to the pump pressure of the particular pump, being open to valve chamber 12, and on its opposite side to reservoir line pressure through a passage 43 and pipe 58.

So long as the pressure in the pump reservoir equals or exceeds the reservoir line pressure, the valve 41 remains closed, and spring 39 maintains the piston valve 37 in open position, in which port 27 is open to port 28 and the main governor mechanism of the pump operates as hereinbefore described, but should the reservoir line pressure become higher than the pump pressure of the particular pump, as would happen in case another pump first cuts in and starts to pump up the pressure in the pipe line 54, then this preponderating reservoir line pressure acting on the outer face of diaphragm 42 moves the diaphragm, and the valve 41 is opened to admit fluid from the reservoir line to the outer face of the piston valve 37. The piston valve is thereupon shifted to its inner position closing port 27 and opening communication from passage 40 to port 28. Fluid under pressure is thus supplied through port 28 to act on the seated area of abutment 8, if the parts are in the cut out position. The consequent equalization of fluid pressures on abutment 8, permits the springs 17 and 19 to shift the main valve mechanism to cut in position, thus supplying air to the piston 3 and causing the pump to cut in.

It will now be apparent that by means of my improvements a compact governor of few parts is provided and in which any desired range between cutting in and cutting out pressures may be accurately determined.

Having now described my invention, what I claim as new and desire to secure by Letters Patent, is:—

1. A pressure governor for pumps comprising a pump controlling device, an actuating piston therefor, a main valve mechanism comprising a valve for controlling ports leading to the actuating piston through which fluid is admitted to and released from said piston, a movable abutment subject to the opposing pressures of the pump and a spring for moving said valve in one direction upon a predetermined decrease in the pump pressure acting on said abutment, and a regulating valve device governed by pump pressure for causing the movement of said main valve mechanism in the opposite direction upon a predetermined increase in pump pressure.

2. A pressure governor for pumps comprising a controlling device, an actuating piston therefor, a main valve for controlling the admission and release of fluid under pressure to and from said actuating piston, a movable abutment subject to pump pressure for operating said main valve, yielding means acting on said movable abutment in opposition to the pump pressure and adapted when the pump pressure diminishes to a predetermined point to shift said abutment, and a regulating valve device subject in one direction to pump pressure and in the opposite direction to the pressure of an adjustable spring for causing the movement of said abutment upon a predetermined increase in pump pressure.

3. A pressure governor for pumps comprising a controlling device, an actuating piston therefor, a main valve mechanism comprising a movable abutment subject on one side to pump pressure, a main valve controlled thereby and adapted in one position to supply air to said actuating piston and in another position to release air therefrom, a spring acting on said abutment and adapted to shift the main valve mechanism to release air from the actuating piston upon a predetermined reduction in pump pressure on said abutment, and a regulating valve device subject to pump pressure for causing the movement of the main valve mechanism to supply air to said actuating piston upon a predetermined increase in pump pressure.

4. A pressure governor for pumps comprising a controlling device, an actuating piston for said controlling device, a valve for controlling the fluid pressure on said actuating piston, a movable abutment for operating said valve subject on one side to pump pressure and having means for permitting equalization of fluid pressure on its opposite sides, means for subjecting a portion of the area of said abutment to fluid at pump pressure in one position, and means acting on said abutment for shifting same from said position when the pump pressure falls to a predetermined point.

5. A pressure governor for pumps comprising a controlling device, an actuating piston for said controlling device, a valve for controlling the fluid pressure on said actuating piston, a movable abutment for operating said valve subject on one side to pump pressure and having means for permitting equalization of fluid pressure on its opposite sides, said abutment being adapted to seat in one position and thereby reduce the area on one side subject to pump pressure, and a spring device acting on said abutment and adapted to shift same from said position when the pump pressure on the abutment diminishes to a predetermined point.

6. A pressure governor for pumps comprising a controlling device, an actuating piston therefor, a main valve mechanism comprising a valve for controlling the fluid pressure on said actuating piston, a movable abutment subject on one side to pump pressure and adapted to permit equalization of fluid pressures on its opposite sides, a regulating valve device subject to pump pressure for causing the movement of said main valve mechanism to a position seating the movable abutment and thereby cutting off a portion of the area of said abutment from the action of pump pressure, and a spring device adapted to shift said abutment from its seat when the pump pressure acting on the abutment diminishes to a predetermined point.

7. A pressure governor comprising a controlling device and an actuating piston, a main valve and movable abutment subject on one side to pump pressure, means for permitting equalization of pressures around said abutment, a regulating valve means operated by pump pressure for releasing fluid from the other side of said abutment, thereby causing said abutment to be shifted to a certain position, said abutment having a seat adapted to cut off a portion of the area of same from pump pressure in said position, and means subject to the opposing pressures from different pumps for controlling the admission of fluid to the seated portion of said abutment.

8. A pressure governor comprising a controlling device and an actuating piston, a main valve for governing the fluid pressure on said actuating piston, a movable abutment subject on one side to pump pressure and having means for permitting equalization of pressures on opposite sides thereof, a spring device tending to shift the main valve and abutment to one position, a regulating valve means subject to pump pressure for releasing fluid from one side of said abutment to shift same to another position, said abutment being provided with a seat adapted in said latter position to cut off a portion of the area of said abutment from pump pressure, and means subject to opposing pressures from different pumps for controlling the admission of fluid under pressure to said seated portion of the abutment, for shifting said abutment and valve to said first position.

9. A pressure governor comprising a controlling device and an actuating piston, a main valve for governing the fluid pressure on said actuating piston, a movable abutment subject to the opposing pressures of the pump and a spring means for operating said main valve in one direction and a regulating valve means governed by pump pressure for varying the pressure on said abutment to operate said main valve in the opposite direction.

In testimony whereof I have hereunto set my hand.

WALTER V. TURNER.

Witnesses:
Wm. M. Cady,
A. M. Clements.

Copies of this patent may be obtained for five cents each, by addressing the "Commissioner of Patents, Washington, D. C."